United States Patent [19]

Thuries et al.

[11] Patent Number: 5,072,083
[45] Date of Patent: Dec. 10, 1991

[54] GROUNDED GAS BLAST CIRCUIT BREAKER/ISOLATING SWITCH WITH VISUAL INSPECTION ASSEMBLY

[75] Inventors: Edmond Thuries; Joseph Martin; Van Doan Pham, all of Meyzieu; Jean Bonnaire, Genas, all of France

[73] Assignee: GEC Alsthom SA, Paris, France

[21] Appl. No.: 563,590

[22] Filed: Aug. 7, 1990

[30] Foreign Application Priority Data

Aug. 7, 1989 [FR] France ............................... 89 10622

[51] Int. Cl.[5] ......................................... H01H 33/82
[52] U.S. Cl. ............................ 200/148 A; 200/148 B
[58] Field of Search ....................... 200/148 A, 148 B

[56] References Cited

U.S. PATENT DOCUMENTS

| 1,463,320 | 7/1923 | Jacobs | 200/48 R |
| 2,936,355 | 5/1960 | Cashwell | 200/148 B |
| 3,290,469 | 12/1966 | Leeds | 200/148 R |

FOREIGN PATENT DOCUMENTS 2305871 10/1976 France .
2355364 1/1978 France .
559438 2/1975 Switzerland .

Primary Examiner—J. R. Scott
Attorney, Agent, or Firm—Sughrue, Mion, Zinn, Macpeak & Seas

[57] ABSTRACT

A circuit breaker/isolating switch device intended, in particular, to be associated with a generator in a power station for protection purposes. The device is disposed inside a metal sheath and comprises a gastight insulating casing filled with a gas having good dielectric properties and at a pressure of a few bars, the casing containing a fixed assembly comprising a fixed permanent contact and a fixed arcing contact, a moving assembly comprising a moving permanent contact and a moving arcing contact, a blast cylinder, a blast piston, and a blast nozzle. The moving assembly is connected to a drive rod passing in gastight manner through the casing and connected outside the casing to a drive mechanism. The casing carries a metal collar disposed level with the contact separation zone and connected to ground and the collar includes a radial channel provided with an optical device enabling the position of the contacts to be inspected.

1 Claim, 2 Drawing Sheets

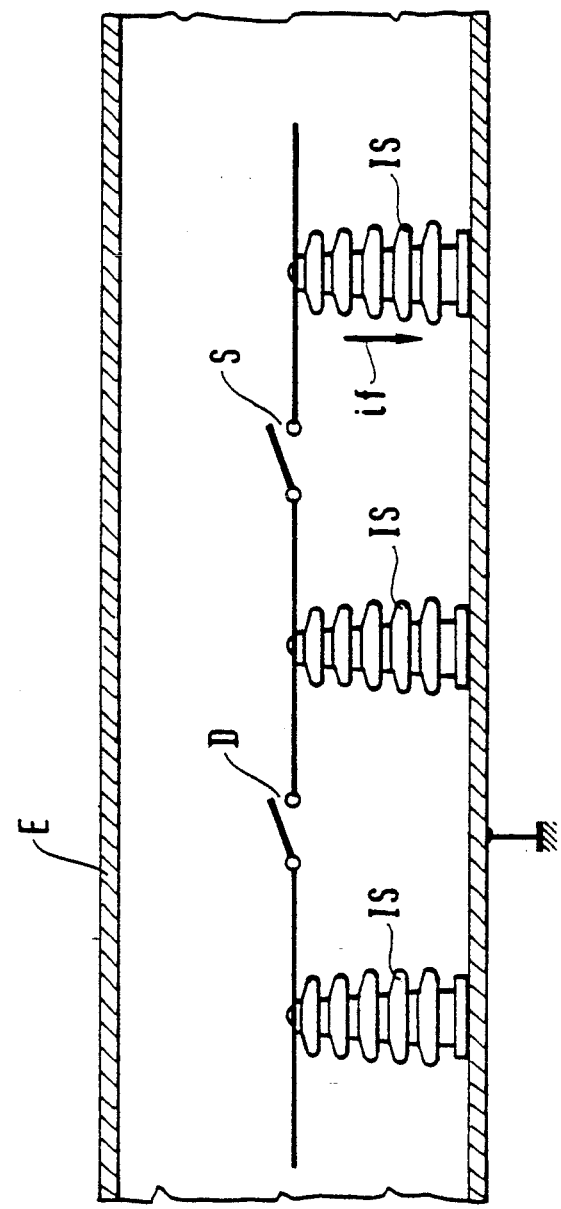

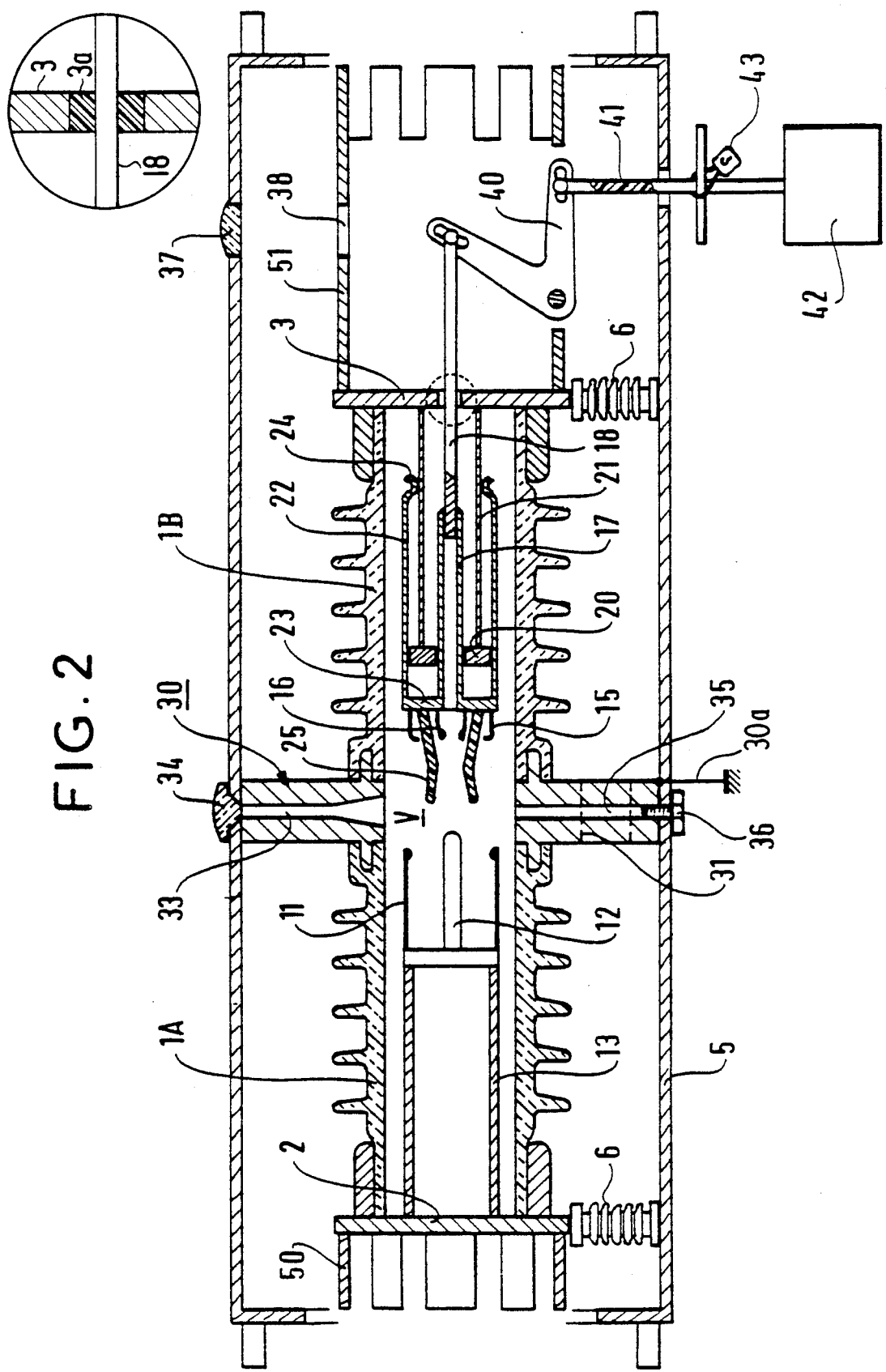

GROUNDED GAS BLAST CIRCUIT BREAKER/ISOLATING SWITCH WITH VISUAL INSPECTION ASSEMBLY

The invention relates to protecting electrical circuits, and in particular generator connection circuits.

BACKGROUND OF THE INVENTION

In electricity power stations, a protective circuit breaker is to be found downstream from each generator. An isolating switch is provided in series with the circuit breaker and downstream therefrom in order to ensure that workers acting on the generator are fully protected. It is recalled that an isolating switch has the property of passing leakage currents to ground via its insulators and of not passing them between its contacts. Such a disposition is illustrated by the diagram of FIG. 1 which shows, in series, a circuit breaker D and an isolating switch S whose active portions are insulated from a grounded screened casing E by insulators IS. When the devices are open, leakage current if passes via the insulators and does not pass between the contacts of the isolating switch.

The Applicant has set out to provide a device where interruption takes place in a dielectric gas under pressure, which device is capable of performing the operations of a circuit breaker while simultaneously providing the protective functions offered by an isolating switch. This device is referred to as a "circuit breaker-/isolating switch". It must have the interrupting power of a circuit breaker and it must also:

- be compact and possess a minimum of parts so as to keep its cost price down;
- enable leakage currents to pass to ground via its insulators;
- enable the state of its contacts to be observed;
- include means for locking its contacts when the apparatus is disengaged; and
- provide adequate dielectric strength in the event of the pressure of its dielectric insulating gas falling suddenly.

Document FR-A-2 305 871 describes a circuit breaker/isolating switch including a dielectric screen which is connected to ground and which is situated between the contacts when they are in the open position.

Document FR-A-2 355 364 describes a circuit breaker including an observation porthole disposed in the casing of the device.

SUMMARY OF THE INVENTION

The present invention provides a circuit breaker-/isolating switch device intended, in particular, to be associated with a generator, the device being disposed inside a metal sheath and comprising a gastight insulating casing filled with a gas having good dielectric properties and at a pressure of a few bars, the casing containing a fixed assembly comprising a fixed permanent contact and a fixed arcing contact, a moving assembly comprising a moving permanent contact and a moving arcing contact, a blast cylinder, a blast piston, and a blast nozzle, said moving assembly being connected to a drive rod passing in gastight manner through said casing and connected outside said casing to a drive mechanism, the casing carrying a metal collar disposed level with the contact separation zone and connected to ground, wherein said collar includes a radial channel provided with an optical device enabling the position of the contacts to be inspected.

BRIEF DESCRIPTION OF THE DRAWINGS

An embodiment of the invention is described by way of example with reference to the accompanying drawings, in which:

FIG. 1 is a diagram showing a circuit breaker in series with an isolating switch; and FIG. 2 is an axial section view through a circuit breaker/isolating switch of the invention.

DETAILED DESCRIPTION

FIG. 1 is described above and it is not described further.

In FIG. 2, references 1A–1B designate a gastight insulating casing provided with fins and co-operating with two metal end plates 2 and 3 to delimit a volume V containing a gas having good dielectric properties under a pressure of one to several bars. The gas is preferably sulfur hexafluoride in the pure state or mixed with another gas such as nitrogen. The two end plates are connected to current terminals 50 and 51 which are in turn connected in conventional manner to the circuit to be protected.

The casing is disposed inside a metal sheath 5 and is supported by insulators 6. The sheath is grounded and it is filled with air under pressure or at atmospheric pressure.

Inside the insulating casing, there is a fixed assembly comprising a permanent contact 11, an arcing contact 12, and a metal tube 13 carrying these two contacts and electrically and mechanically connected to the end plate 2.

The inside of the casing also contains a moving assembly comprising a permanent contact 15 and an arcing contact 16 both connected to a metal tube 17 which is extended by a metal drive rod 18 which passes in gastight manner at 3a through the end plate 3.

A blast piston 20 disposed at the end of a tube 21 fixed to the end plate 3 is capable of moving relative to a metal blast cylinder 22 which is electrically and mechanically connected to the tube 17 by a metal ring 23. The blast cylinder is terminated by sliding electrical contacts 24 which co-operate with the tube 17.

A blast nozzle 25 of insulating material completes the equipment inside the casing 1A–1B.

The insulating casing is in contact with a metal collar 30 which is electrically and preferably also mechanically connected to the sheath 5. The collar is placed level with the zone where the contacts of the device separate, which contacts are shown in the open (disengaged) position in the figure.

The collar 30 is grounded at 30a by the sheath 5 and it diverts leakage currents which are therefore completely prevented from passing via the contacts of the device. The device thus acts both as a circuit breaker and as an isolating switch.

The collar 30 is provided with through passages 31 enabling the air inside the sheath 5 and under pressure or at atmospheric pressure to flow therethrough.

In accordance with the invention, the collar 30 is pierced by a radial channel 33 having an optical device 34 at one end thereof to enable the state of the contacts to be inspected visually.

The collar 30 is also provided with a radial passage 35 for enabling the volume V to be filled with insulating gas. In normal operation, the passage 35 is closed by a gastight plug 36.

In order to ensure adequate dielectric strength of the device when in the open position and should the pressure of the insulating gas drop suddenly, an adequate distance is chosen by construction between the contacts when in the open state to ensure greater dielectric strength between the contacts than to ground.

The drive rod 18 is connected via a bell crank 40 and an insulating rod 41 to a conventional hydraulic, pneumatic, or mechanical drive mechanism 42. A conventional locking member represented in the figure by a padlock 43 serves to ensure that the device cannot be wrongly operated when in the open position.

The sheath 5 carries an optical device 37 enabling the position of the bell crank 40 and of the drive rods 18 and 41 to be inspected through an opening 38 in the current terminal 51.

The device described above by way of non-limiting example makes it possible to omit an air-insulated isolating switch in an installation for protecting a generator.

The device of the invention is compact and saves space in power stations.

It has low Joule losses, so its operation is cheap.

It includes few moving parts and consequently it is cheaper to build and its maintenance costs are reduced.

It is particularly applicable to protecting generators in electricity power stations.

We claim:

1. A circuit breaker/isolating switch device disposed inside a metal sheath and comprising a gastight insulating casing within said metal sheath and coaxial therewith and filled with a gas under pressure having good dielectric properties, said casing containing at a contact separation zone a fixed assembly and a moving assembly, said fixed assembly comprising a fixed permanent contact and a fixed arcing contact, said moving assembly comprising a moving permanent contact engagable with and disengagable from said fixed permanent contact and a moving arcing contact engagable with and disengagable from said fixed arcing contact, said moving assembly further comprising a blast cylinder supporting internally a blast piston, and said moving assembly including a blast nozzle, said moving assembly being connected to a drive rod passing through said casing and connected outside said casing to a drive mechanism, said casing carrying a metal collar disposed level with said contact separation zone and being electrically connected to ground, and said collar including a radial channel provided with an optical device enabling the position of the contacts at said contact separation zone to be visually inspected radially remote from said contact separation zone.

* * * * *